Aug. 26, 1969    SHIGEO NAKASHIMA    3,462,917
MEANS FOR SUPPLYING PACKING BAGS
Filed Jan. 23, 1968    9 Sheets-Sheet 1

INVENTOR.
SHIGEO NAKASHIMA
BY Kurt Kelman
AGENT

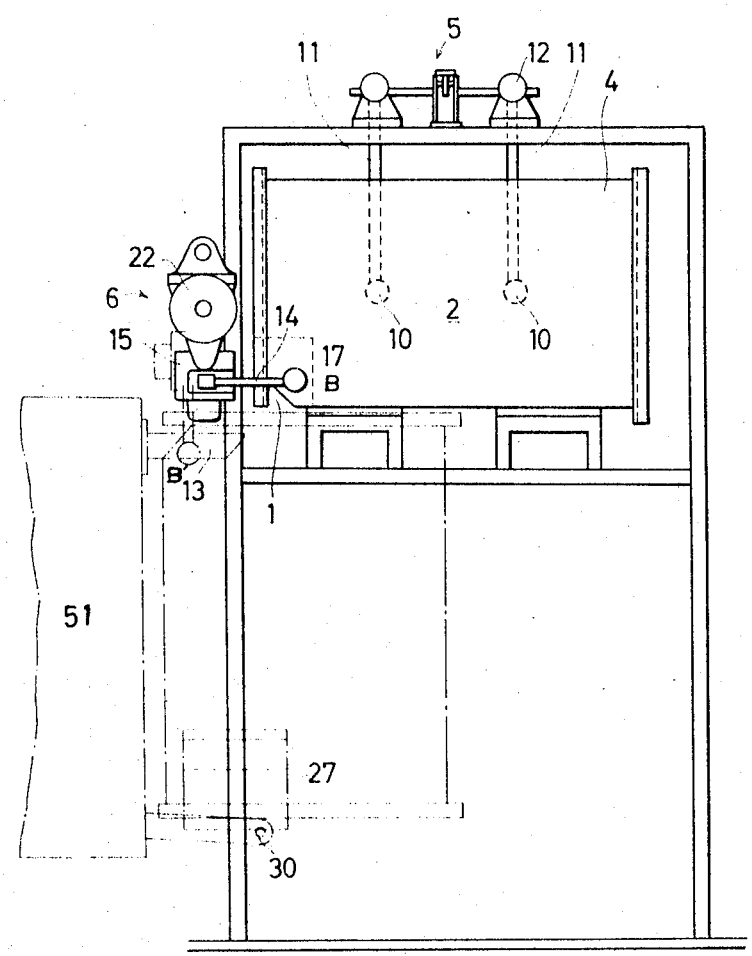

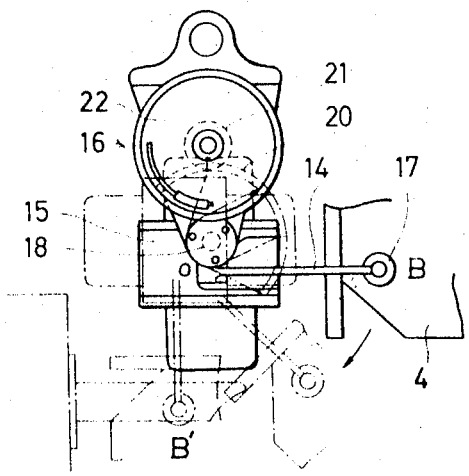
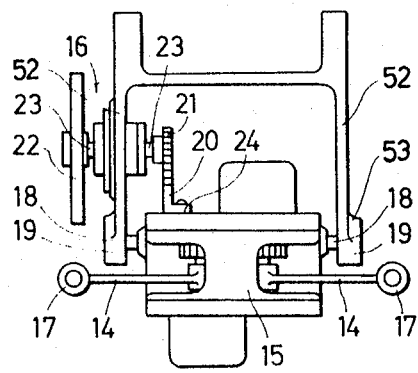
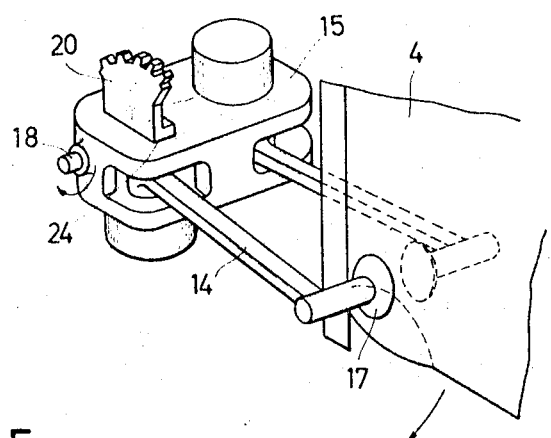
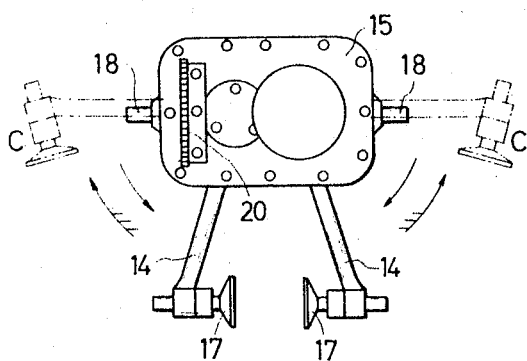

Aug. 26, 1969 SHIGEO NAKASHIMA 3,462,917
MEANS FOR SUPPLYING PACKING BAGS
Filed Jan. 23, 1968 9 Sheets-Sheet 4

INVENTOR
SHIGEO NAKASHIMA
BY Kurt Kelman
AGENT

Aug. 26, 1969  SHIGEO NAKASHIMA  3,462,917
MEANS FOR SUPPLYING PACKING BAGS
Filed Jan. 23, 1968  9 Sheets-Sheet 7

INVENTOR.
SHIGEO NAKASHIMA
BY Kurt Kelman
AGENT

INVENTOR.
SHIGEO NAKASHIMA
BY
Kurt Kelman
AGENT

United States Patent Office 3,462,917
Patented Aug. 26, 1969

3,462,917
MEANS FOR SUPPLYING PACKING BAGS
Shigeo Nakashima, 7–7 Koaza Tenjinmori, Oaza Morimoto, Mukomachi, Otokuni-gun, Kyoto-fu, Japan
Filed Jan. 23, 1968, Ser. No. 699,900
Claims priority, application Japan, Jan. 31, 1967, 42/6,194; Aug. 11, 1967, 42/51,542
Int. Cl. B65b *43/18, 43/30, 39/02*
U.S. Cl. 53—386         3 Claims

---

ABSTRACT OF THE DISCLOSURE

Means for supplying packing bags which are enclosed in a magazine and stacked in a horizontal direction, comprising a horizontally pulling out mechanism and a vertically guiding mechanism, in said horizontally pulling out mechanism only the end of one of the packing bags is pulled out by turns from the magazine in the horizontal direction and in said vertically guiding mechanism, the packing bag which is pulled out horizontally is rotated vertically downward to a transition point where into the charging hole of the rotated packing bag is inserted the blow-in tube of an automatic measuring and packing apparatus.

---

Background of the invention

This invention relates to means for supplying packing bags in conjunction with an apparatus for automatically measuring and packing a predetermined and constant amount of materials to be packed into a bag.

Summary of the invention

The means for supplying packing bags of this invention is composed of a magazine enclosing a plurality of packing bags and means for guiding successively the packing bags to an apparatus for automatically measuring and packing a predetermined and constant amount of materials so that the blow-in tube of the apparatus is inserted into the charging hole of the packing bag, said means for guiding the packing bags is constituted by a horizontally pulling out mechanism in which the packing bags are pulled out horizontally from the magazine to displace the bag to a transition point and by a vertically guiding mechanism in which the packing bag pulled out horizontally is displaced by being rotated vertically downward.

Therefore, an object of this invention is to provide means for supplying packing bags in which the end one of the packing bags which are stacked in the horizontal direction is pulled out by means of sucking action of suckers provided on guiding rods.

Another object of this invention is to provide means for supplying packing bags in which the packing bag which is pulled out horizontally is pinched by bag pinching levers at the neighbourhood of the charging hole of the packing bag and by means of sucking action of suckers provided on the bag pinching levers the charging hole is opened.

A further object of this invention is to provide means for supplying packing bags in which the packing bag with the charging hole opened is rotated vertically downward to insert the blow-in tube of an automatic measuring and packing apparatus snugly into the charging hole of the packing bag.

A still further object of this invention is to provide means for supplying packing bags in which after the end one of the packing bags is pulled out horizontally, pinched, opened at the charging hole and rotated vertically, the pinching action is released to return a device for holding bag pinching lever.

Brief description of the drawing

FIG. 2 is a side elevation view of the means for supplying packing bags shown in FIG. 1;

FIG. 3 is a front elevation view of the vertically guiding mechanism utilized in the means for supplying packing bags shown in FIGS. 1 and 2;

FIG. 4 is a side elevation view of the vertically guiding mechanism shown in FIG. 3;

FIG. 5 is a plan view of the vertically guiding mechanism shown in FIG. 3;

FIG. 6 is a perspective view of the vertically guiding mechanism in which the operation of the mechanism is graphically explained;

Description of the preferred embodiments

Figure 1:
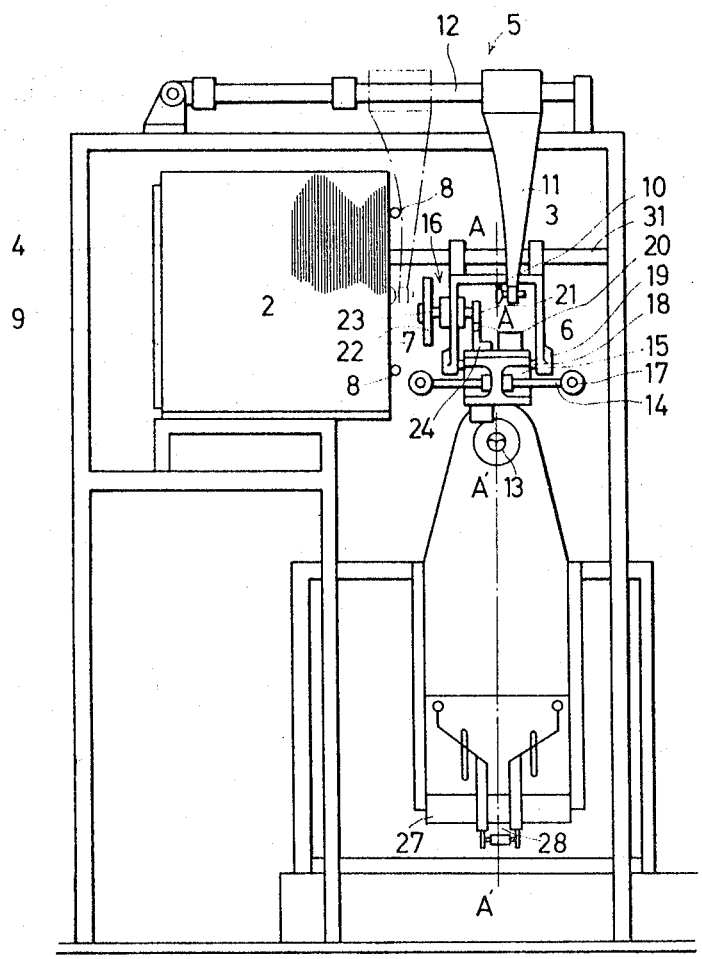
FIG. 1 is a front elevation view of an embodiment of the means for supplying packing bags provided in accordance with the invention.

As shown in FIGS. 1 and 2, a plurality of packing bags 4 are enclosed in a magazine 2 used for enclosing the packing bags in such a manner that a charging hole 1 locates at the left lower corner of the magazine as shown in FIG. 2 and the plural packing bags are stacked from the left to the right as shown in FIG. 1. A proper means 9 for urging the packing bags from the left to the right under a predetermined constant pressure is provided at the left end of the magazine to urge the packing bags toward a bag take out side 7 which locates at the right end of the magazine, a pair of bag stoppers 8 being provided at the right end of the magazine so as to prevent the rightmost packing bag from falling out of the magazine.

Means 3 for guiding packing bags 4 is constituted by a horizontally pulling out mechanism 5 and a vertically guiding mechanism 6. Horizontally pulling out mechanism 5 comprises a pair of guiding rods 11 each having a sucker 10 at its extremity and a pair of guiding shafts 12 which hang guiding rods 11 so that guiding rod 11 can be displaced along guiding shaft 12 according to a proper power applied thereto.

Vertically guiding mechanism 6 comprises a pair of bag pinching levers 14, a device 15 for holding the bag pinching levers and buffer means 16. The vertically guiding mechanism hangs on a supporting rod 31 and the center line of the vertically guiding mechanism registers with a line determined by the front surfaces of suckers 10, as shown by line A—A in FIG. 1. Each of bag pinching levers 14 is provided with a sucker 17 and mounted on device 15 rotatably 90° in the horizontal direction. Device 15 is provided with a pair of shafts 18 at each side thereof and shafts 18 are supported in bearings 19 which are locating at the lower end of holding plates 53 projecting from frames 52 so that device 15 can rotate around shafts 18 with bag pinching levers 14 at their positions. A buffer means 16 comprises a sector gear 20, a pinion 21 meshing with sector gear 20 and a balancing wheel 22, said pinion 21 and said balancing wheel 22 being mounted on a shaft 23 together. The buffer means is mounted on frames 52 by means of a suitable supporting device. As shown in FIGS. 3 to 6, sector gear 20 is fixed to a part of upper surface 24 of device 15 and the shape of sector gear 20 is arranged so that when bag pinching levers 14 rotate from a position OB to a position OB' sector gear 20 disengages from pinion 21.

The operations of the horizontally pulling out mechanism and the vertically guiding mechanism are explained in detail hereinafter in conjunction with the travelling of a packing bag.

In the horizontally pulling out mechanism, after the initiation of the operation of the means for guiding packing bags, guiding rods 11 move horizontally toward bag take out side 7 until guiding rods stop by affixing suckers 10 to the rightmost one of the plurality of packing bags 4 which are enclosed in magazine 2, as shown by the one dot chain line in FIG. 1. At the same time, a vacuum pump operates, not shown in the figure, to reduce the pressure in the suckers and to move guiding rods 11 apart from bag take out side 7 with the rightmost packing bag being held by the suckers to a position shown by line A—A in FIG. 1. The rightmost packing bag is naturally held by the sucking force due to suckers 10 and the position identified by line A—A is made to be registered with a line A'—A' which is determined by blow-in tube 13 and packing bag cradle 27.

In the vertically guiding mechanism, device 15 holding bag pinching levers 14 is displaced in the direction shown by the arrow to a position OB' from a position OB at which suckers 17 touch packing bag 4 situating on the line A—A from both sides of the packing bag clockwise by means of some kinds of prime mover, such as an electrically energized solenoid or a rotary torque actuator supplied with compressed air in FIG. 3.

First, an example is explained in which an electrically energized solenoid is utilized to displace bag pinching levers 14 shown as single tailed arrow or triple tailed arrow in FIG. 5. A vacuum pressure is applied within suckers 17 to suck the packing bag on the line A—A at the neighborhood of charging hole 1 and at the same time the driving power from the solenoid acting on bag pinching levers 14 for displacing it is released. Bag pinching levers 14, then, are preliminarily urged to return to the original position shown as triple tailed arrow in FIG. 5 by means of a proper mechanism, such as an air pressure or a spring. The sucking action due to suckers 10 is also released to loosen the packing bag from guiding rods 11 so that suckers 17 gradually open charging hole 1. Since packing bag 4 separates from suckers 10 which has been holding the packing bag, suckers 17 now hold the packing bag and vertically guiding mechanism 6 rotates around shafts 18 due to the weight of the packing bag with charging hole opened, in the direction shown by the arrow in FIGS. 2 and 3 from a position OB to a position OB'. A suitable power may be applied in addition to the self-weight of the packing bag to facilitate the rotation of vertically guiding mechanism 6. The packing bag displaces downward about 90° with bag pinching lever 14 so that blow-in tube 13 which projects from an automatic measuring and packing apparatus 51, is inserted into charging hole 1 and bottom 50 of the packing bag rests in recess 28 provided in the base of packing bag cradle 27.

Then, by releasing the sucking action of suckers 17 by means of any suitable manner such as by discontinuing of supplying vacuum pressure, bag pinching lever returns to the original position due to the restoring force. Since vertically guiding mechanism 6 is so designed that the whole assembly of the vertically guiding mechanism is in a balanced condition about shaft 18 when bag pinching lever 14 is at the first position as shown in FIG. 2 or 3, in other words, the center of gravity of the vertically guiding mechanism is under shaft 18, when at position OB' the sucking action of suckers 17 is released, the weight of the packing bag no more acts on the bag pinching lever to rotate the device for holding the bag pinching lever at the position OB', the vertically guiding mechanism rotates counterclockwise around shafts 18 to restore the position OB. As device 15 approaches the position OB, sector gear 20 fixed on the upper surface of device 15 meshed with pinion 21 so that balancing wheel 22 absorbs the inertia due to the rotation of device 15 to the position OB to stop device 15 punctually at the original position. Bag pinching levers 14 also restore to the original position C shown in FIG. 5.

Figure 17:
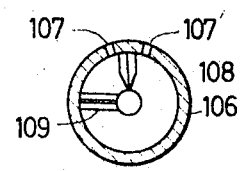
FIG. 17 shows the fundamental mechanism of a rotary torque-actuator in section utilized in the means shown in FIG. 11.
Figure 16:
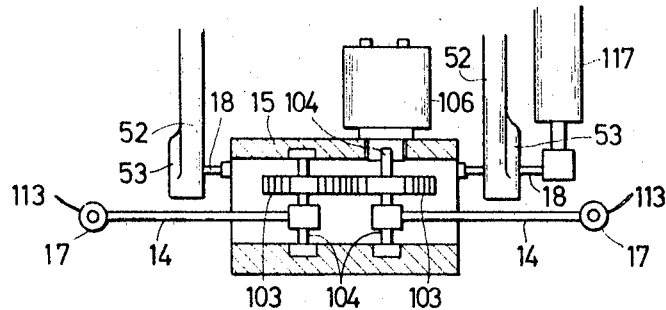
FIG. 16 is a partially sectional view of a part shown in FIG. 14.

Second, another example is explained in which an air operated rotary torque actuator (hereinafter, referred to as a torque actuator) is utilized to displace bag pinching levers 14. As shown in FIGS. 13 to 16, shafts 104 of gear wheels 103 are supported in device 15, to each of shafts 104 being fixed a pair of bag pinching levers 14 respectively and to one of shafts 104 being connected operatively a torque actuator 106. The construction of the torque actuator is shown in FIG. 17 schematically, in which a pair of openings 107 and 107' which act as inlet and outlet for introducing fluid are provided on the body of torque actuator 106, a fixed plate 108 is provided to separate the chamber of torque actuator 106 into two divisions each being lead to opening 107 or 107' and a rotating blade 109 is provided within the chamber rotatably around the shaft of torque actuator 106. Rotating blade 109 rotates in accordance with the fluid pressure introduced through opening 107 or 107' by the operation of an electromagnetic valve 110, shown in FIGS. 18 to 21 to displace bag pinching levers 14. A pair of air hoses 113 are connected respectively to suckers 17 which are provided at the extremity of bag pinching levers 14, said air hoses being communicated to a vacuum pump, not shown in the figures. At the extension of shafts 18 which bear device 15 agains tholding plates 53 of frame 52, a cellcylinder 117 is provided to rotate 90° device 15 about shaft 18 vertically downward and to return 90° device 15 about shaft 18 vertically upward.

Figure 18:
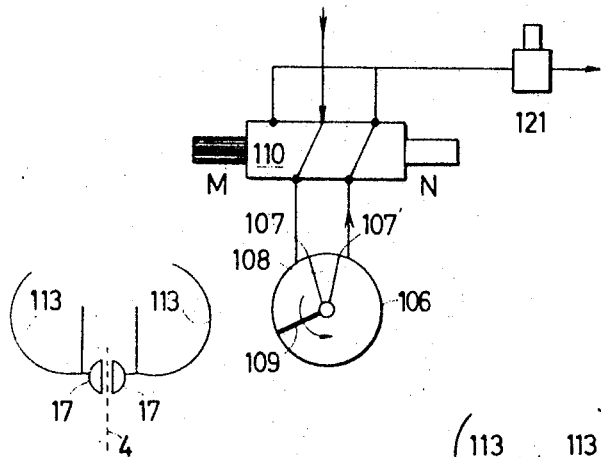
FIGS. 18 to 21 show in skeleton the operation of the rotary torque-actuator.

As shown in FIG. 18, when the solenoid M of electromagnetic valve 110 is energized, a fluid such as a compressed air flows in the direction shown by the arrow added on the flow lines to rotate rotating blade 109 counterclockwise where opening 107 serves as an inlet and opening 107' serves as an outlet so that bag pinching levers 14 move in such a manner that a pair of suckers 17 face each other at a place near to charging hole 1 of packing bag 4. A solenoid 121 is deenergized and opens itself to pass the flow of fluid coming from opening 107' to the atmosphere and a sucking pressure is applied to packing bag 4 through suckers 17 which is then supplied by a vacuum pressure.

Figure 19:
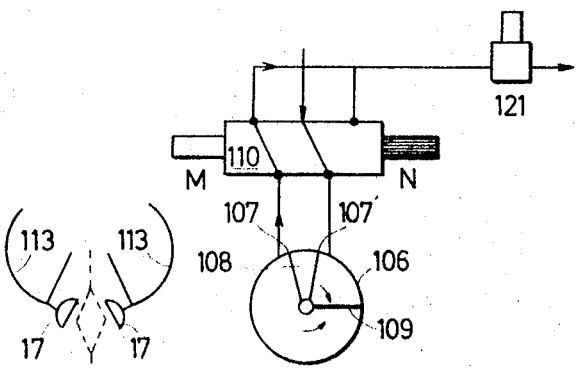

As shown in FIG. 19, as soon as bag pinching levers 14 pinch packing bag 4, the solenoid N of electromagnetic valve 110 is energized and the solenoid M is deenergized and solenoid 121 is energized. The fluid now flows in the direction shown by the arrow added on the flow lines to rotate rotating blade 109 clockwise where opening 107' serves as an inlet and opening 107 serves as an outlet. As solenoid 121 is energized to close itself rotating blade 109 does not travel the whole course to the original position but it stops half-way where the pressure introduced through opening 107' balances the pressure stopped by the valve operated by solenoid 121. Under these conditions, bag pinching levers 14 also stop their movement in a half opened state where charging hole 1 is fully opened. Then, cellcylinder 117 actuates to rotate 90° device 15 about shaft 18 vertically downward and blow-in tube 13 is succeedingly inserted into charging hole 1 by means of the operation of bag pinching levers 14.

Figure 20:
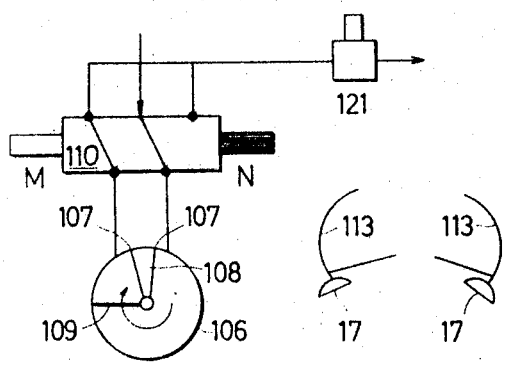

As shown in FIG. 20, after blow-in tube 13 is inserted into charging hole 1 solenoid 121 is deenergized to open itself and the fluid stopped by solenoid 121 flows through solenoid 121 to the atmosphere so that bag pinching levers 14 move further apart. At the same time the sucking action of suckers 17 is stopped to release the packing bag from the suckers.

Figure 21:
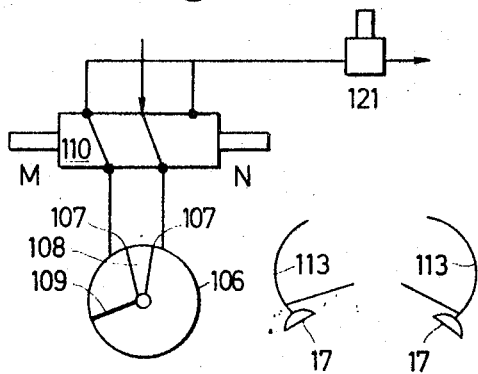

As shown in FIG. 21, the solenoid N is deenergized and device 15 rotates 90° about shaft 18 vertically upward by the restoring force of cellcylinder 117 with bag pinching levers 14 opened, in other words bag pinching levers 14 are returned to the original position.

When the bottom of the packing bag which has been rotated vertically downward with device 15 rests in recess 28 and blow-in tube 13 is inserted into charging hole 1, the automatic measuring and packing apparatus begins its operation. A pressurized air is supplied into an inflating tube 29 which is made of flexible material such as rubber and which is provided at the basic part of blow-in tube 13 so as to inflate the inflating tube and to fit the inflating tube tightly with the inner side of charging hole 1. Under this condition, packing bag 4 is held at its position with charging hole 1 being inflated by inflating tube 29 and with bottom 50 being rested by packing bag cradle 27.

Figure 7:
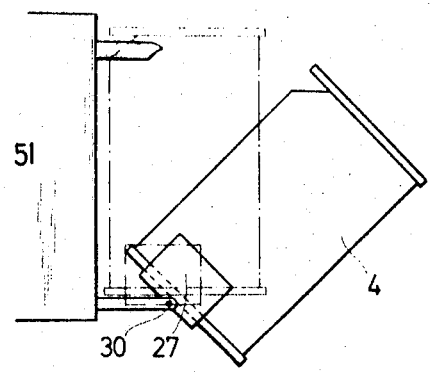
FIG. 7 is the side elevational view of the cradle for the packing bags and explains the operation of the cradle.
Figure 8:
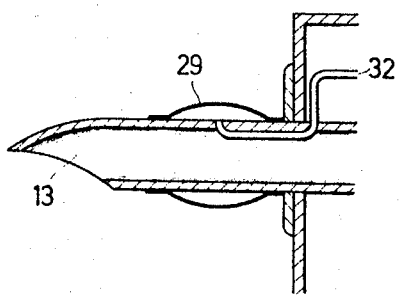
FIG. 8 is a sectional view of the blow-in tube utilized in the means shown in FIG. 1.
Figure 9A:
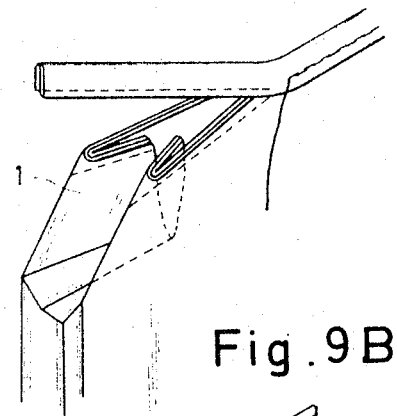
FIGS. 9A and 9B show the detail of the packing bag.
Figure 10A:
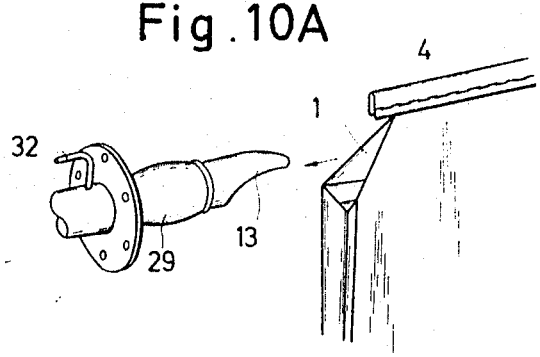
FIGS. 10A and 10B show the relation between the packing bag and the blow-in tube.
Figure 9B:
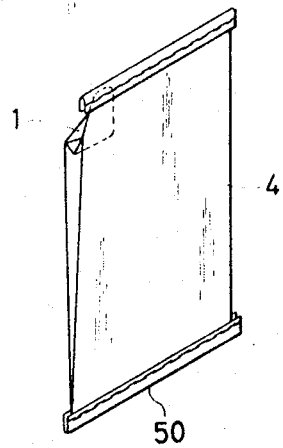
Figure 10B:
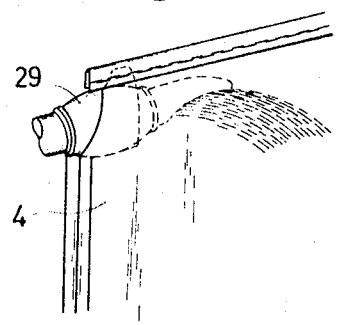
Figure 11:
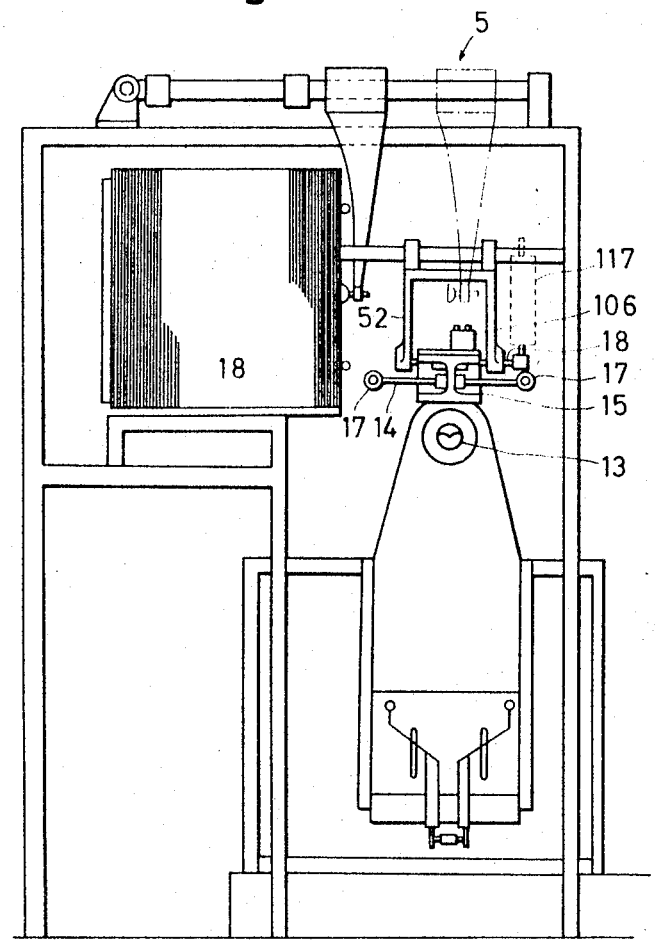
FIG. 11 is a front elevation view of another embodiment of the means for supplying packing bags provided in accordance with the invention.
Figure 12:
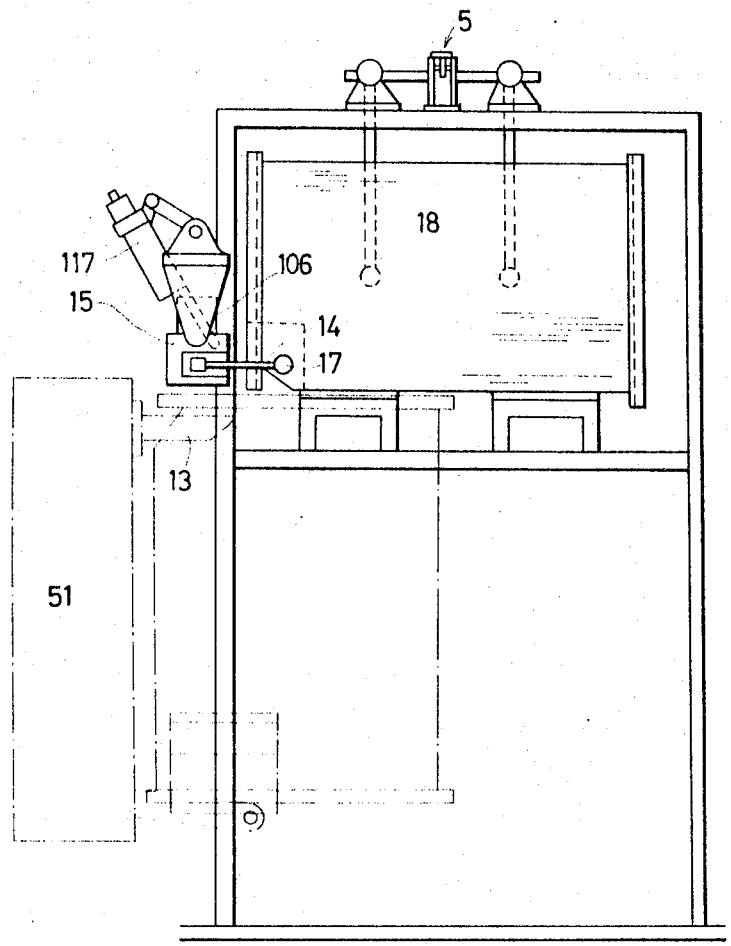
FIG. 12 is a side elevation view of the means for supplying packing bags shown in FIG. 11.
Figure 13:
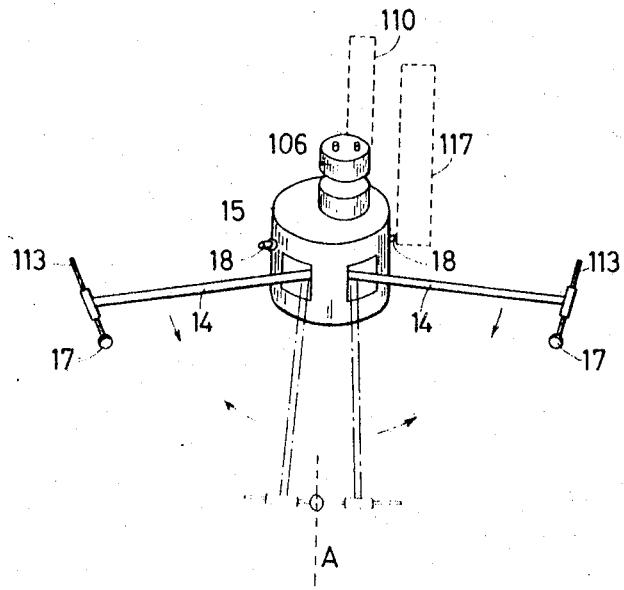
FIG. 13 shows the operation of the bag pinching lever utilized in the means for supplying packing bags shown in FIG. 11.
Figure 14:
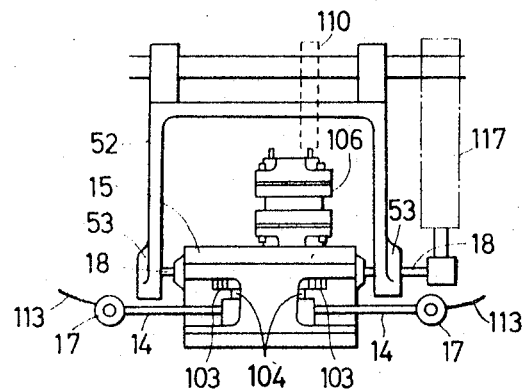
FIG. 14 is a side elevation view of the main operating part of the torque-actuator and the apparatus for holding the bag pinching lever.
Figure 15:
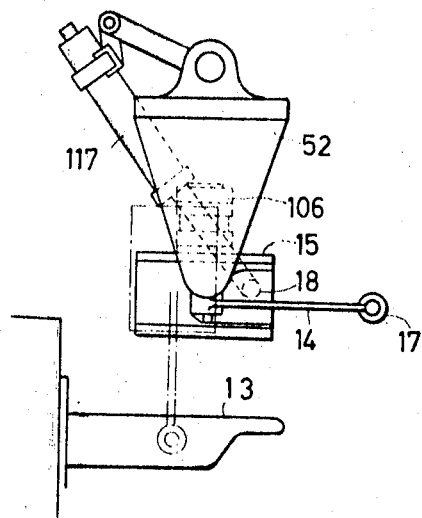
FIG. 15 is a front elevation view of the main operating part shown in FIG. 14.

The operation of the automatic measuring and packing apparatus is further explained hereinafter but the explanation is not the principal material of this invention. The material to be charged is discharged from the outlet of blow-in tube 13 into packing bag. When the weight of the material to be charged reaches a predetermined value, blow-in of the material is stopped by the operation of the measuring mechanism in the automatic measuring and packing apparatus and at the same time feeding of pressurized air to inflating tube 29 is also stopped to contract inflating tube to restore the original condition. As the result of this operation, the tightness between packing bag 4 and blow-in tube 13 is released and the weight of the material charged into packing bag 4 causes packing bag cradle 27 to rotate about fulcrum 30 and to tilt forwardly as shown in FIG. 7. The packing bag thus fully charged is automatically pulled out.

The means for guiding packing bags, including the horizontally pulling out mechanism and the vertically guiding mechanism, is so designed that after the fully charged packing bag is automatically pulled out when the packing bag cradle restores the initial horizontal position, the blow-in tube is immediately inserted into the charging hole of the succeeding packing bag and also the bottom of the succeeding packing bag rests in the recess in the base of the packing bag cradle to begin the next charging of the material. Therefore, the capacity of the automatically packing bag supplying means of this invention is remarkably improved in contrast with the prior art.

What is claimed is:

1. Means for supplying packing bags, comprising a magazine enclosing said packing bags and means for guiding said packing bags, characterized in that said means comprises a horizontally pulling out mechanism and a vertically guiding mechanism, said horizontally pulling out mechanism pulling out one of said packing bags by turns horizontally from said magazine and said vertically guiding mechanism rotating the pulled out packing bag vertically downwardly, said horizontally pulling out mechanism being provided with a pair of suckers each of which is fixed at the extremity of a pair of guiding rods respectively to suck only the end one of the packing bags which are stacked in the horizontal direction, said vertically guiding mechanism being provided with a device for holding a pair of bag pinching levers with suckers at the extremity thereof, said device being rotated vertically downwardly when the bag pinching levers pinch the packing bag and said device being rotated vertically upwardly when the bag pinching levers release the packing bag after insertion of a blow-in tube of an automatic measuring and packing apparatus into the charging hole of the packing bag.

2. Means for supplying packing bags as specified in claim 1 which is further characterized in that the actuation of said device is effected by an electrically energized solenoid.

3. Means for supplying packing bags as specified in claim 1 which is further characterized in that the actuation of said device is effected by an air operated rotary torque actuator.

References Cited

UNITED STATES PATENTS 3,312,038  4/1967  Knauf _____ 53—190

GERALD M. FORLENZA, Primary Examiner

GEORGE F. ABRAHAM, Assistant Examiner

U.S. Cl. X.R.

53—188; 214—8.5; 294—64